United States Patent
Makino et al.

(10) Patent No.: US 7,786,184 B2
(45) Date of Patent: Aug. 31, 2010

(54) ACTIVE ENERGY RAY CURABLE RESIN COMPOSITION AND SHEET-LIKE OPTICAL ARTICLE

(75) Inventors: Shinji Makino, Kanagawa (JP); Tsuyoshi Nakagawa, Tokyo (JP); Koichiro Sanefuji, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 485 days.

(21) Appl. No.: 11/665,185

(22) PCT Filed: Oct. 12, 2005

(86) PCT No.: PCT/JP2005/018787

§ 371 (c)(1),
(2), (4) Date: Apr. 12, 2007

(87) PCT Pub. No.: WO2006/041089

PCT Pub. Date: Apr. 20, 2006

(65) Prior Publication Data

US 2009/0030104 A1    Jan. 29, 2009

(30) Foreign Application Priority Data

Oct. 15, 2004  (JP)  ............... 2004-301700

(51) Int. Cl.
*C08F 2/50*  (2006.01)
*C08J 3/28*  (2006.01)

(52) U.S. Cl. .................. 522/152; 522/90; 522/96; 522/150; 522/162; 522/173; 522/174; 428/409; 428/411.1; 428/422.8; 428/423.1; 252/582; 252/588; 252/589; 264/1.1; 264/1.34; 264/1.31; 264/1.36; 264/1.38

(58) Field of Classification Search .............. 525/50, 525/451; 522/90, 96, 162; 428/409, 411.1, 428/422.8, 423.1; 252/582, 588, 589; 264/1.1, 264/1.31, 1.34, 1.36, 1.38
See application file for complete search history.

(56) References Cited

U.S. PATENT DOCUMENTS

| | | | |
|---|---|---|---|
| 6,177,535 B1 * | 1/2001 | Schwalm et al. | 528/49 |
| 6,649,271 B2 * | 11/2003 | Taruishi | 428/447 |
| 2005/0036768 A1 * | 2/2005 | Matsuishi et al. | 386/126 |
| 2006/0204749 A1 * | 9/2006 | Kita et al. | 428/343 |

FOREIGN PATENT DOCUMENTS

| | | |
|---|---|---|
| JP | 11-166030 | 6/1999 |
| JP | 2000-297246 | 10/2000 |
| JP | 2001-113648 | 4/2001 |
| JP | 2003-201331 | 7/2003 |
| JP | 2003-302501 | 10/2003 |
| JP | 2004-284178 | 10/2004 |
| JP | 2005-330403 | 12/2005 |
| WO | WO 2006/014000 | * 2/2006 |

* cited by examiner

*Primary Examiner*—Sanza L McClendon
(74) *Attorney, Agent, or Firm*—Morgan, Lewis & Bockius LLP (57) ABSTRACT

An active energy ray curable resin composition for a sheet-like optical article capable of providing a cured material having a dynamic elastic modulus at 25° C. of 950 MPa or less and a dynamic elastic modulus at 60° C. of 100 MPa or more and a sheet-like optical article prepared from the resin composition are disclosed. The sheet-like optical article (e.g., prism sheet) has good heat resistance and extremely small warpage.

3 Claims, 2 Drawing Sheets

ACTIVE ENERGY RAY CURABLE RESIN COMPOSITION AND SHEET-LIKE OPTICAL ARTICLE

TECHNICAL FIELD

The present invention relates to an active energy ray curable resin composition used for producing a sheet-like optical article such as a prism sheet, a lenticular lens sheet or a Fresnel lens, and a sheet-like optical article containing a cured material prepared by curing the resin composition.

BACKGROUND ART

Sheet-like optical articles include, for example, Fresnel lens sheets used for a projection screen of a projection television and the like, lenticular lens sheets and prism sheets used for a backlight of a liquid crystal display device. These articles generally have a structure in which a lens part made of a cured resin material is formed on the surface of a sheet-shaped transparent substrate. For example, as described in Japanese Patent Laid-Open No. 2000-297246, a prism sheet is produced by a process comprising casting an active energy ray curable resin between a sheet-shaped transparent substrate such as a transparent plastic sheet and a cylindrical lens mold having a lens pattern on the surface and curing the resin composition by irradiating the resin composition with an active energy ray from the side of the sheet while transporting the sheet, thereby continuously forming prisms. In Japanese Patent Laid-Open No. 2000-297246, a composition using hexafunctional urethane (meth)acrylate and a di(meth)acrylate compound in combination is proposed in Examples as an active energy ray curable resin for a prism sheet.

The resin composition described in the publication has good scratch resistance and heat resistance when formed into a prism sheet. However, the prism sheet tends to be warped at four corners when put on a level position with the prism face upward. For this reason, the sheet has a problem that handling of the sheet using a machine and determining the position to put the prism sheet in handling is difficult in the step of assembling the sheet in a backlight. Moreover, warpage of the sheet tends to become even greater when put in a high temperature condition for more than a given time, sometimes affecting image qualities.

DISCLOSURE OF THE INVENTION

An object of the present invention is to provide an active energy ray curable resin composition suitable for producing a sheet-like optical article having good heat resistance and extremely small warpage and a sheet-like optical article prepared from the resin composition.

Sheet-like optical articles composed of a sheet-shaped transparent substrate and a lens part prepared by curing an active energy ray curable resin are warped because stress generated inside the lens when forming the lens part remains. Therefore, to reduce the warpage of sheet-like optical articles, reduction of residual stress is required.

As a method of reducing warpage, there may be employed, for example, a method in which the polymerization shrinkage of a resin composition is reduced and a method in which the elastic modulus of a cured material is reduced so as to decrease the stress caused by shrinking during cooling from molding temperature to handling temperature. However, generally the polymerization shrinkage can only be reduced to a limited range and so solving the problem of warpage seems difficult. On the other hand, while the elastic modulus of a cured material can be significantly reduced, the reduction of elastic modulus tends to cause adverse effects such as decrease in heat resistance.

The present inventors have conducted various studies to solve the above problems and as a result have found conditions for achieving extremely small warpage and good heat resistance of a sheet-like optical article in handling environment by designing an appropriate dynamic elastic modulus of a cured material of an active energy ray curable resin in terms of temperature, and the present invention has been completed. Herein, the dynamic elastic modulus refers to elastic modulus measured when applying vibrational strain (stress) to a cured resin material in measurement of dynamic viscoelasticity, which is generally described as G'.

More specifically, the warpage herein discussed means warpage of a sheet-like optical article at about 25° C.; thus, setting the dynamic elastic modulus at 25° C. of a cured resin material sufficiently low makes it possible to produce a sheet-like optical article totally free from warpage. However, in such cases, the cured resin material tends have a dynamic elastic modulus at high temperature (e.g., 60° C.) lower than that necessary for maintaining heat resistance required for a sheet-like optical article, often causing heat deformation. Also, setting higher dynamic elastic modulus at 60° C. so as to prevent heat deformation makes the dynamic elastic modulus at 25° C. higher than that necessary for reducing warpage, causing increase in warpage of a sheet-like optical article.

Under such circumstance, the present inventors have noticed that setting the upper limit of the dynamic elastic modulus at 25° C. of a cured resin material and the lower limit of the dynamic elastic modulus at 60° C. to optimal ranges makes it possible to reduce warpage and improve heat resistance of a sheet-like optical article, and conducted intensive studies. As a result, they have found an ideal relationship between the dynamic elastic modulus of a cured resin material and temperature for reducing warpage and achieving sufficient heat resistance, and completed the present invention. The present inventors have also found an active energy ray curable resin composition suitable for achieving the relationship between the dynamic elastic modulus and temperature defined above, and completed the present invention.

Moreover, as a result of intensive studies on physical properties of a lens part of a sheet-like optical article with the above characteristics, it has been found that the relation between the indentation elastic modulus of a lens part in the form of a product and temperature is equivalent to the relation between the dynamic elastic modulus of a cured material of an active energy ray curable resin processed into a flat board and temperature, which has led to the completion of the present invention.

Accordingly, the present invention provides an active energy ray curable resin composition for a sheet-like optical article capable of providing a cured material having a dynamic elastic modulus at 25° C. of 950 MPa or less and a dynamic elastic modulus at 60° C. of 100 MPa or more and a sheet-like optical article prepared from the resin composition.

The present invention also provides an active energy ray curable resin composition for a sheet-like optical article comprising (A) a urethane acrylate compound obtained by reacting hexamethylene diisocyanate, an isocyanurate-type triisocyanate compound prepared by trimerizing hexamethylene diisocyanate, 2-hydroxypropyl acrylate and pentaerythritol triacrylate, (B) a di(meth)acrylate compound containing no urethane bond and containing two (meth)acryloyl groups in the molecule and (C) a radical photopolymerization initiator, and a sheet-like optical article prepared from the resin composition.

The present invention also provides a sheet-like optical article comprising a lens part having an indentation elastic modulus at 25° C. of 1000 MPa or less and an indentation elastic modulus at 60° C. of 90 MPa or more.

The present invention makes it possible to produce an active energy ray curable resin composition for a sheet-like optical article having reduced warpage and excellent heat resistance suitable for forming a lens part of a prism sheet for a backlight and a sheet-like optical article prepared form the resin composition.

BEST MODE FOR CARRYING OUT THE INVENTION (1) Active energy ray curable cured resin material for sheet-like optical article.

A cured material obtained by curing the resin composition of the present invention by an active energy ray has a dynamic elastic modulus at 25° C. of 950 MP or less and a dynamic elastic modulus at 60° C. of 100 MPa or more. Preferably, the cured material has a dynamic elastic modulus at 25° C. of 700 MPa or less and a dynamic elastic modulus at 60° C. of 150 MPa or more.

A dynamic elastic modulus at 25° C. of 950 MPa or less makes it possible to sufficiently reduce warpage. A dynamic elastic modulus at 60° C. of 100 MPa or more prevents heat deformation at 60° C. and improves heat resistance.

The active energy ray curable resin composition of the present invention is not particularly limited as long as the composition can be formed into a cured material suitable for at least a part of a sheet-like optical article, i.e., a cured material having a dynamic elastic modulus at 25° C. of 950 MPa or less and a dynamic elastic modulus at 60° C. of 100 MPa or less. For example, a resin composition containing urethane (meth)acrylate, epoxy (meth)acrylate, ester (meth) acrylate, an enethiol compound composed of polyene and polythiol and a radical photopolymerization initiator, and/or a resin composition containing an epoxy compound, an oxetane compound, a vinyl ether compound and a cationic photopolymerization initiator may be used. Of these, a resin composition containing a urethane (meth)acrylate compound, an ester (meth)acrylate compound and a radical photopolymerization initiator is particularly preferred.

Further, a resin composition containing (A) a urethane (meth)acrylate compound containing at least one urethane (meth)acrylate compound having three or more (meth)acryloyl groups in the molecule, (B) a di(meth)acrylate compound containing no urethane bond and containing two (meth)acryloyl groups in the molecule and (C) a radical photopolymerization initiator is preferred. The resin composition may also contain (D) a compound having a polymerizable double bond group in the molecule and (E) another component. Each component is described below.

(A) Urethane (Meth)Acrylate Compound

Component (A) used for the resin composition of the present invention is a compound containing at least a urethane (meth)acrylate compound having three or more (meth)acryloyl groups in the molecule. Component (A) induces polymerization reaction or crosslinking reaction when irradiated with an active energy ray such as ultraviolet light in the presence of a radical photopolymerization initiator and basically gives scratch resistance and heat resistance to a lens part of a sheet-like optical article. Component (A) may contain at least one urethane (meth)acrylate compound having three or more (meth)acryloyl groups in the molecule, and may also contain a urethane (meth)acrylate compound having one or two (meth)acryloyl groups in the molecule.

The urethane (meth)acrylate compound having three or more (meth)acryloyl groups in the molecule is typically a compound obtained by reacting a polyisocyanate compound having two or more isocyanate groups in the molecule and at least one (meth)acryloyl compound having at least one (meth) acryloyl group and a hydroxyl group in the molecule. As the polyisocyanate compound having two or more isocyanate groups in the molecule, various polyisocyanate compounds classified into aliphatic, alicyclic or aromatic compounds may be used. In consideration of coloring properties when curing and light yellowing resistance of a cured material, isophorone diisocyanate, hexamethylene diisocyanate and trimers thereof (adduct type, biuret type or isocyanurate type) are preferred. Of these, isophorone diisocyanate and isocyanurate-type hexamethylene diisocyanate trimers are more preferred in view of scratch resistance and heat resistance of a cured material.

The (meth)acryloyl compound having at least one (meth) acryloyl group and a hydroxyl group in the molecule is not particularly limited. Examples thereof include hydroxyethyl (meth)acrylate, 2-hydroxypropyl (meth)acrylate, 4-hydroxybutyl (meth)acrylate, glycerol di(meth)acrylate, pentaerythritol tri(meth)acrylate and 2-hydroxy-1-acryloyloxy-3-methacryloyloxypropane. Here, acrylate compounds are better than methacrylate compounds in view of photo-curing properties.

The polyisocyanate compound and the (meth)acryloyl compound having a hydroxyl group may be each used in combination of two or more of them. Changing types of combinations and ratios makes it possible to exert elastic modulus and other properties different from those of urethane (meth)acrylate compounds prepared from a single polyisocyanate compound and a single (meth)acryloyl compound.

The urethanization reaction between the polyisocyanate compound and the (meth)acryloyl compound having a hydroxyl group may be performed by a common method. For example, a urethane (meth)acrylate compound can be easily synthesized by heating to 60 to 100° C. using a tin compound such as dibutyltin dilaurate as a catalyst. To adjust the viscosity of urethane (meth)acrylate, a reactive diluent such as low viscosity (meth)acrylate which is not directly involved in the reaction may be used.

In particular, as component (A), a urethane acrylate compound obtained by reacting hexamethylene diisocyanate, an isocyanurate-type triisocyanate compound prepared by trimerizing hexamethylene diisocyanate (an isocyanurate-type hexamethylene diisocyanate trimer), 2-hydroxypropyl acrylate and pentaerythritol triacrylate is preferred. Examples of such urethane acrylate compounds include mixtures of urethane acrylate compounds represented by the following structural formulas (1) to (7). When using such component (A), the resulting resin composition has relatively low polymerization shrinkage, is hardly colored when cured and has excellent curing properties, and a cured material thereof has excellent light resistance, scratch resistance and heat resistance. Also, use of such component (A) is suitable for adjusting the dynamic elastic modulus of the resin composition to an optimal range.

(1)

(2)

(3)

(4)

(5)

(6)

-continued (7)

The molar ratio of hexamethylene diisocyanate to the isocyanurate-type hexamethylene diisocyanate trimer is preferably in the range of 2.0 to 4.0. When the molar ratio is within the range, the shrinkage of a cured material does not increase too much or neither does the dynamic elastic modulus.

The molar ratio of 2-hydroxypropyl acrylate to pentaerythritol triacrylate is preferably in the range of 0.25 to 1.0. When the molar ratio is within the range, the dynamic elastic modulus of a cured material does not increase too much and sufficient tenacity can be given.

The molar ratio of the hydroxy groups to the isocyanurate groups in the urethane acrylate compound structure is preferably in the range of 1.0 to 1.5. When the molar ratio is 1.0 or more, the amount of unreacted isocyanate remaining in the resin composition can be reduced and storage stability can be improved. When the molar ratio is 1.5 or less, the content of unreacted pentaerythritol triacrylate or 2-hydroxypropyl acrylate can be reduced, making it possible to prevent increase of curing shrinkage.

The amount to be mixed of component (A) is preferably 5 to 90 parts by mass, more preferably 10 to 80 parts by mass, particularly preferably 10 to 50 parts by mass based on 100 parts by mass of the total amount of component (A), component (B) and component (D). The lower limits of the above ranges are significant for the scratch resistance and heat resistance of a lens part of a sheet-like optical article. The upper limits of the above ranges are significant for being able to adjust the dynamic elastic modulus of a cured resin material with component (B) and component (D) and reducing warpage of the sheet.

(B) Di(Meth)Acrylate Compound

Component (B) used for the resin composition of the present invention is a di(meth)acrylate compound containing no urethane bond and containing two (meth)acryloyl groups in the molecule. Component (B) induces polymerization reaction or crosslinking reaction when irradiated with an active energy ray such as ultraviolet light in the presence of a radical photopolymerization initiator. When mixed with component (A), component (B) mainly contributes to reduction of the viscosity of the resulting resin composition, improves formability of a lens part on the surface of a transparent plastic substrate and helps to adjust the dynamic elastic modulus of a cured resin material to a designed value.

Aliphatic di(meth)acrylate and bisphenol A or F di(meth)acrylate having a molecular weight of 500 or more are preferred as component (B).

Specific examples of component (B) include di(meth)acrylate of polyalkylene glycol such as polyethylene glycol, polypropylene glycol and polybutylene glycol; caprolactone-modified di(meth)acrylate of hydroxypivalic acid neopentylglycol ester, di(meth)acrylate in which the number of moles of ethylene oxide added to bisphenol A is 4 or more, di(meth)acrylate in which the number of moles of ethylene oxide added to hydrogenated bisphenol A is 4 or more, di(meth)acrylate in which the number of moles of ethylene oxide added to bisphenol F is 4 or more and di(meth)acrylate in which the number of moles of ethylene oxide added to hydrogenated bisphenol F is 4 or more.

Of these, di(meth)acrylate of polybutylene glycol, di(meth)acrylate in which the number of moles of ethylene oxide added to bisphenol A is 6 or more, di(meth)acrylate in which the number of moles of ethylene oxide added to hydrogenated bisphenol A is 6 or more, di(meth)acrylate in which the number of moles of ethylene oxide added to bisphenol F is 6 or more and di(meth)acrylate in which the number of moles of ethylene oxide added to hydrogenated bisphenol F is 6 or more are preferred in view of adjusting the dynamic elastic modulus of a cured resin material.

Further, compounds represented by the following formulas (I) and (II) are preferred because the scratch resistance of a lens part of a sheet-like optical article is not decreased.

(I)

wherein l represents an integer of 5 to 15.

(II)

wherein m and n represents an integer satisfying m+n of 6 to 20.

Component (B) described above may be used alone or in combination of two or more.

The amount to be mixed of component (B) is preferably 10 to 90 parts by mass, more preferably 20 to 90 parts by mass, particularly preferably 30 to 80 parts by mass based on 100 parts by mass of the total amount of component (A), component (B) and component (D). The lower limits of the above ranges are significant for reducing the viscosity of a resin composition and thus improving formability of a lens part on the surface of a transparent plastic substrate, and also for adjusting the dynamic elastic modulus at 25° C. of a cured resin material so as not to be increased, thereby reducing warpage of a sheet-like optical article. The upper limits of the above ranges are significant for preventing the dynamic elastic modulus of a cured resin material from decreasing too much and giving sufficient heat resistance and scratch resistance to a lens part of a sheet-like optical article.

(C) Radical Photopolymerization Initiator

Component (C) used for the resin composition of the present invention is a radical photopolymerization initiator. Component (C) initiates radical polymerization of an ethylenically unsaturated compound with a free radical generated by irradiation of an active energy ray such as ultraviolet light or visible light.

Various compounds conventionally known as radical photopolymerization initiators may be used as component (C). Specific examples of ultraviolet sensitive radical photopolymerization initiators that can be used as component (C) include carbonyl compounds such as benzoin, benzoin monomethyl ether, benzoin monoethyl ether, benzoin isopropyl ether, acetoin, acetophenone, benzyl, benzophenone, p-methoxybenzophenone, diethoxyacetophenone, 2,2-dimethoxy-1,2-diphenylethan-1-one, 2,2-diethoxyacetophenone, 1-hydroxycyclohexyl phenyl ketone, methyl phenylglyoxylate, ethyl phenylglyoxylate, 2-hydroxy-2-methyl-1-phenylpropan-1-one, 2-methyl-1-[4-(methylthio)phenyl]-2-morpholinopropanon-1-one, 2-benzyl-2-dimethylamino-1-(4-morpholinophenyl)butanone-1 and 2-hydroxy-1-{4-[4-(2-hydroxy-2-methylpropionyl)-benzyl]-phenyl}-2-methylpropan-1-one [available from Ciba Specialty Chemicals, product name: IRGACURE 127]; sulfur compounds such as tetramethylthiuram monosulfide and tetramethylthiuram disulfide; and acylphosphine oxide such as 2,4,6-trimethylbenzoyldiphenylphosphine oxide, bis(2,6-dimethoxybenzoyl)-2,4,4-trimethylpentylphosphine oxide and bis(2,4,6-trimethylbenzoyl)phenylphosphine oxide. Specific examples of visible light sensitive radical photopolymerization initiators that can be used as component (C) include camphorquinone and bis($\eta^5$-2,4-cyclopentadien-1-yl)-bis(2,6-difluoro-3-(1H-pyrrol-1-yl)-phenyl)titanium [available from Ciba Specialty Chemicals, product name IRGACURE 784].

Of these, 2,2-dimethoxy-1,2-diphenylethan-1-one, benzoin monoethyl ether, 1-hydroxycyclohexyl phenyl ketone, methyl phenylglyoxylate, 2-hydroxy-2-methyl-1-phenylpropan-1-one, 2-hydroxy-1-{4-[4-(2-hydroxy-2-methylpropionyl)-benzyl]-phenyl}-2-methylpropan-1-one and 2-benzyl-2-dimethylamino-1-(4-morpholinophenyl)butanone-1,2,4,6-trimethylbenzoyldiphenylphosphine oxide are preferred in view of curing properties and coloring properties of a cured resin material.

The above radical photopolymerization initiator may be used alone or in combination of two or more.

The amount to be mixed of component (C) is preferably 0.01 to 10 parts by mass, more preferably 0.05 to 5 parts by mass, particularly preferably 0.1 to 4 pails by mass based on 100 parts by mass of the total amount of component (A), component (B) and component (D). The lower limits of the above ranges are significant for curing properties of a resin composition by an active energy ray. The upper limits of the above ranges are significant for preventing remarkable yellowing of a lens part of a sheet-like optical article.

(D) Compound Having One Polymerizable Double Bond Group in Molecule

Component (D) used for the resin composition of the present invention is a compound having one polymerizable double bond group in the molecule. Component (D) induces polymerization reaction when irradiated with an active energy ray such as ultraviolet light in the presence of a radical photopolymerization initiator. Component (D) contributes to reduction of the viscosity of the resulting resin composition, improves formability of a lens part on the surface of a transparent plastic substrate and relaxes part of the internal stress generated in a cured resin due to polymerization shrinkage during curing. In short, addition of component (D) to components (A) to (C) makes it possible to further reduce the warpage of a sheet-like optical article.

A mono(meth)acrylate compound can be typically used as component (D). However, component (D) is not particularly limited thereto and compounds having one double bond in the molecule may be used. Typical examples of component (D) include phenyl (meth)acrylate, benzyl (meth)-acrylate, phenylethyl (meth)acrylate, phenoxyethyl (meth)acrylate, p-cumylphenol ethylene oxide-modified (meth)acrylate, isobornyl (meth)acrylate, cyclohexyl (meth)acrylate, dicyclopentenyl (meth)acrylate, methyl (meth)acrylate, ethyl (meth)acrylate, propyl (meth)acrylate, n-butyl (meth)acrylate, i-butyl (meth)acrylate, t-butyl (meth)acrylate, pentyl (meth)acrylate, 2-ethyl-hexyl (meth)acrylate, n-hexyl (meth)acrylate, 2-hydroxyethyl (meth)acrylate, lauryl (meth)acrylate, 2-hydroxypropyl (meth)acrylate, 4-hydroxybutyl (meth)acrylate, tetrahydrofurfuryl (meth)acrylate, phosphoethyl (meth)acrylate, (meth)acryloylmorpholine, dicyclopentadiene (meth)acrylate, styrene, vinyl toluene and chlorostyrene.

Component (D) described above may be used alone or in combination of two or more.

The amount to be mixed of component (D) is preferably 0.1 to 20 parts by mass, more preferably 0.5 to 15 parts by mass, particularly preferably 1 to 10 parts by mass based on 100 parts by mass of the total amount of component (A), component (B) and component (D). The lower limits of the above ranges are significant for reducing the viscosity of a resin composition and reducing the warpage of a sheet-like optical article. The upper limits of the above ranges are significant for the heat resistance of a lens part of a sheet-like optical article.

(E) Other Components

In order to improve scratch resistance and releasability, a fluorine-containing compound or a compound containing a long chain alkyl group having 8 or more carbon atoms may also be used for the resin composition of the present invention according to need. Specific examples of fluorine-containing compounds include trifluoroethyl (meth)acrylate, tetrafluoropropyl (meth)acrylate, octafluoropentyl (meth)acrylate and heptadecafluorodecyl (meth)acrylate. Specific examples of compounds containing a long chain alkyl group having 8 or more carbon atoms include long chain alkyl compounds pounds such as dimer diol (e.g., product name: PRIPOL 2033 available from Uniqema) and di(meth)acrylate of dimer diol.

In addition, various additives such as antioxidants, ultraviolet absorbers, photostabilizers (HALS, etc.), leveling agents, heat stabilizers, coating material modifiers, flame retardants, polymerization inhibitors, radical thermal polymerization initiators, cationic photopolymerization initiators, cationic thermal polymerization initiators, photopolymerization accelerators, sensitizers and release agents may also be contained.

Component (E) is used in an amount that does not affect the substantial effects of the resin composition of the present invention. For example, preferably 0 to 10 parts by mass, more preferably 0 to 4 parts by mass of component (E) is added based on 100 parts by mass of the total amount of component (A), component (B) and component (D).

(2) Preparation of active energy ray curable resin composition for sheet-like optical article The active energy ray curable resin composition for a sheet-like optical article of the present invention composed of components (A) to (D) and an optional additional component (E) is sufficiently mixed until homogeneous using a stirrer chip or a stirring rod with a blade. The components should be mixed under lighting equipment such as a yellow lamp so that photopolymerization is not initiated.

The resin composition of the present invention has a viscosity at 25° C. of preferably 100 to 5000 mPa·s, more preferably 150 to 3000 mPa·s in view of handling in casting the composition into a lens mold and controlling the thickness of a lens part when producing a sheet-like optical article. When the resin composition has a viscosity of 5000 mPa·s or less, even fine lens patterns formed on the lens mold can be transferred and also the thickness of the lens part can be easily controlled to a thin thickness. When the resin composition has a viscosity of 100 mPa·s or more, an uncured resin composition sandwiched between the lens mold and the sheet-shaped transparent substrate hardly leaks from the side, and it is also possible to prevent the thickness of the lens part from decreasing too much.

The concentration of strong acid contained in the resin composition of the present invention is preferably less than 100 ppm, more preferably less than 50 ppm in view of the adhesiveness between a sheet-shaped transparent substrate and a lens part of a sheet-like optical article composed of the lens part prepared by curing the resin composition and the substrate after treating the article under high humidity conditions.

A concentration of strong acid contained in the resin composition of less than 100 ppm makes it possible to suppress hydrophilicity of a cured material prepared by irradiating the resin composition with an active energy ray. This consequently suppresses moisture absorption of the cured material and water intrusion into the interface of a lens part and a sheet-shaped substrate when treating a sheet-like optical article under high humidity conditions, making it easy to maintain adhesiveness.

Some of the (meth)acrylate compounds used in the present invention is prepared through a step in which strong acid is used. In such cases, strong acid present in the (meth)acrylate compound as impurity may be incorporated into the resin composition. Specific examples of strong acid include sulfuric acid, nitric acid, hydrochloric acid, perchloric acid and p-toluenesulfonic acid.

As a method of removing strong acid mixed in the (meth)acrylate compound as impurity, purification such as alkali cleaning may be used. Examples of alkali cleaning include a method in which 0.1 to 2 g of an aqueous solution of sodium hydroxide, potassium hydroxide, sodium carbonate or sodium hydrogen carbonate or aqueous ammonia is used based on 1 g of a (meth)acrylate compound and stirring the mixture in a tank. Such alkali cleaning may be repeated several times until the concentration of strong acid in the resin composition is less than 100 ppm.

(3) Sheet-Like Optical Article

The sheet-like optical article of the present invention is prepared from the resin composition of the present invention. The article has, for example, a lens part composed of a cured material cured by irradiating the resin composition of the present invention with an active energy ray. The lens part is, for example, formed on at least one surface of a sheet-shaped transparent substrate.

Figure 1:
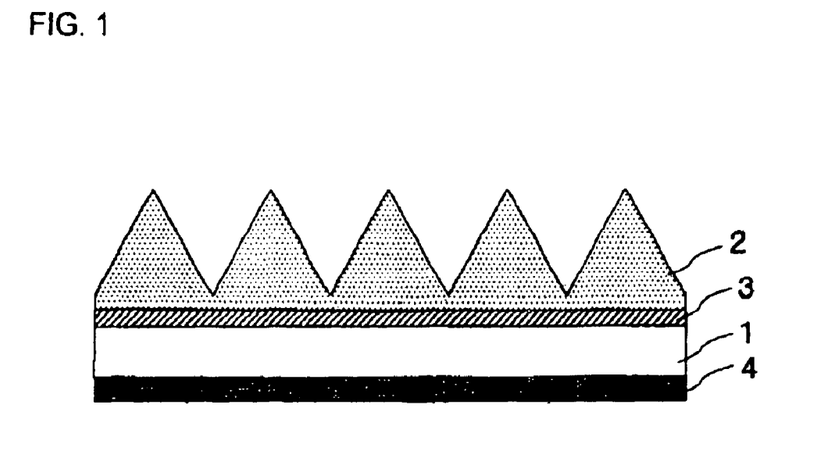
FIG. 1 is a schematic partial cross-sectional view of an aspect of the sheet-like optical article of the present invention (prism sheet)

A prism sheet, which is an embodiment of the sheet-like optical article of the present invention, is described with reference to FIG. 1. In the embodiment shown in FIG. 1, the prism sheet is composed of a sheet-shaped transparent substrate 1 and a lens part 2 made of a cured material of the resin composition of the present invention, in which numerous rows of prisms are aligned.

The sheet-shaped transparent substrate 1 is not particularly limited as long as an active energy ray is transmitted therethrough. Examples thereof include a film, a sheet or a board made of an acrylic resin, a polycarbonate resin, a polyester resin, a vinyl chloride resin or a polymethacrylimide resin.

Generally, for the relationship between the thickness of a substrate film and the warpage of a sheet-like optical article having a lens layer only on one side, the thicker the film, the more advantageously the warpage of the sheet-like optical article is reduced when the two are made of the same material. However, with a great demand for prism sheets with a thin substrate in the market, substrates having a thickness of 200 or less are generally used. In the present invention, when the sheet-like optical article is a prism sheet, a substrate film having a thickness of 50 to 200 µm is preferably used.

The lens part 2 may be disposed directly on the surface of the sheet-shaped transparent substrate 1. Alternatively, to improve the adhesiveness with the sheet-shaped transparent substrate 1, the lens part 2 may be disposed after performing surface treatment for improving the adhesiveness on the surface of the sheet-shaped transparent substrate 1 so as to form a surface treated portion 3. Examples of such surface treatment include a method for forming an adhesive layer composed of a polyester resin, an acrylic resin or a urethane resin on the surface of the sheet-shaped transparent substrate 1 and a method for roughening the surface of the sheet-shaped transparent substrate 1. Further, a surface processed portion 4 may be formed on the side of the sheet-shaped transparent substrate 1 opposite from the lens part 2 by surface processing for making beams transmitted through the prism sheet more homogeneous. For such surface processing, materials obtained by mixing the active energy ray curable resin with a dispersing agent such as organic fine particles or silica fine particles having a different refractive index may be used.

The sheet-shaped transparent-substrate 1 may be subjected to another treatment such as antistatic treatment, antireflection treatment or treatment of preventing adhesion of substrates.

Physical properties of a lens part, i.e., hardness, elastic modulus, creep deformation characteristics and recovery from elastic deformation, can be measured by test equipment called "Dynamic Ultra Micro Hardness Tester" or "Micro Hardness Testing System". The elastic modulus herein measured is called indentation elastic modulus and related to Young's modulus. The relation between indentation elastic modulus and Young's modulus is described in "Evaluation of Material Properties by Universal Hardness Test" (Cornelia Heermant, Dieter Dengel, translated by Shigeo Katayama, Sigeo Sato) in "Material Testing Technology" (vol. 43, No. 2, p 148-152, 1998, April).

The lens part of the sheet-like optical article of the present invention has an indentation elastic modulus of 1000 MPa or less at 25° C. and 90 MPa or more at 60° C., preferably 900 MPa or less at 25° C. and 100 MPa or more at 60° C., more preferably 800 MPa or less at 25° C. and 300 MPa or more at 60° C.

An indentation elastic modulus at 25° C. of 1000 MPa or less makes it possible to sufficiently reduce warpage. An indentation elastic modulus at 60° C. of more than 90 MPa prevents heat deformation at 60° C. and improves heat resistance.

(4) Mold and Light Source Used for Producing Sheet-Like Optical Article

Examples of dies used for producing a sheet-like optical article include dies made of metal such as aluminum, brass and steel, dies made of synthetic resin such as a silicon resin, a urethane resin, an epoxy resin, an ABS resin, a fluorine resin and a polymethylpentene resin, dies of such a material finished with plating and dies made of a material to which metal powder is added. In particular, metal dies are preferred in view of heat resistance and strength and suitable for continuous production. More specifically, metal dies have an advantage that they are resistant to polymerization heat, hardly deformed, hardly scratched, temperature-controllable and suitable for high precision molding.

As an active energy ray light emitting source used for producing a sheet-like optical article, a chemical lamp, a low pressure mercury lamp, a high pressure mercury lamp, a metal halide lamp, an electrodeless UV lamp (available from FUSION UV SYSTEMS JAPAN K.K.), a visible light halogen lamp, a xenon lamp and sunlight may be used. Irradiation of an active energy ray may be performed in air or inert gas such as nitrogen or argon. The active energy ray is irradiated so that the accumulated energy in a wavelength range of 200 to 600 nm, preferably 320 to 390 nm is, for example, 0.01 to 10 J/cm², preferably 0.5 to 8 J/cm².

EXAMPLES

The present invention is described in more detail with reference to Examples and Comparative Examples below. In the following description, "part(s)" means "part(s) by mass".

Synthetic Example 1

Synthesis of Urethane Acrylate Compound (UA1)

A glass flask was charged with 117.6 g (0.7 mole) of hexamethylene diisocyanate and 151.2 g (0.3 mole) of an isocyanurate-type hexamethylene diisocyanate trimer as isocyanate compounds, 128.7 g (0.99 mole) of 2-hydroxypropyl acrylate and 693 g (1.54 moles) of pentaerythritol triacrylate as (meth)acryloyl compounds containing a hydroxyl group, 100 ppm of di-n-butyltin dilaurate as a catalyst and 0.55 g of hydroquinone monomethyl ether as a polymerization inhibitor. The mixture was allowed to react at 70 to 80° C. until the residual isocyanate concentration was 0.1% or less, whereby a urethane acrylate compound (UA1) was obtained. The urethane acrylate compound (UA1) is a mixture of urethane acrylate compounds represented by the above-described structural formulas (1) to (7).

Synthetic Example 2

Synthesis of Urethane Acrylate Compound (UA2)

A glass flask was charged with 1110 g of isophorone diisocyanate (IPDI, available from Daicel-Huels Ltd.), 2 g of di-n-butyltin dilaurate as a catalyst and 1.5 g of 2,6-di-tert-butyl-4-methyl phenol as a polymerization inhibitor. The mixture was heated to 70° C. with stirring. With stirring the mixture while maintaining the temperature at 70° C., 3129 g of pentaerythritol triacrylate (product name: NK ESTER A-TMM-3L available from Shin-nakamura Chemical Co., Ltd.) was added dropwise thereto over 5 hours. The temperature was kept at 70° C. for additional 8 hours to give a urethane acrylate compound (UA2). The progress of the reaction was observed by titration of isocyanate groups. The point where 96% or more of the isocyanate groups disappeared was determined to be the end point of the reaction.

The urethane acrylate compound (UA2) is represented by the following structural formula (8).

Preparation of Active Energy Ray Curable Resin Composition

Example 1

35 parts of the urethane acrylate compound (UA1) as component (A), 25 parts of dimethacrylate (product name: ACRYESTER PBOM available from MITSUBISHI RAYON CO., LTD.) represented by the following formula (9) [a compound in which I in the formula (1) is 9] and 40 parts of dimethacrylate (product name: NEW FRONTIER BPEM-10 available from DAI-ICHI KOGYO SEIYAKU CO., LTD.) represented by the following formula (10) as components (B) and 1.2 parts of 1-hydroxycyclohexyl phenyl ketone (product name: IRGACURE 184 available from Ciba Specialty Chemicals) as component (C) were mixed to give an active energy ray curable resin composition.

Example 2

An active energy ray curable resin composition was prepared in the same manner as in Example 1 except that the amount of dimethacrylate represented by the formula (9) which is component (B) was changed to 20 parts and 5 parts of phenoxyethyl acrylate (product name: NEW FRONTIER PHE available from DAI-ICHI KOGYO SEIYAKU CO., LTD.) was added as component (D).

Example 3

An active energy ray curable resin composition was prepared in the same manner as in Example 1 except that the amount of dimethacrylate represented by the formula (10) which is component (B) was changed to 30 parts and 10 parts of phenoxyethyl acrylate was added as component (D).

Example 4

An active energy ray curable resin composition was prepared in the same manner as in Example 1 except that the amount of the urethane acrylate compound (UA1) which is component (A) was changed to 40 parts and 60 parts of dimethacrylate represented by the following formula (11) (product name: NEW FRONTIER GX-8684 available from DAI-ICHI KOGYO SEIYAKU CO., LTD.) was used as component (B).

Example 5

An active energy ray curable resin composition was prepared in the same manner as in Example 1 except that each compound was purified so that the concentration of p-toluenesulfonic acid contained in the resin composition was 70 ppm.

Example 6

An active energy ray curable resin composition was prepared in the same manner as in Example 1 except that each compound was purified so that the concentration of p-toluenesulfonic acid contained in the resin composition was 20 ppm.

Example 7

An active energy ray curable resin composition was prepared in the same manner as in Example 2 except that each compound was purified so that the concentration of p-toluenesufonic acid contained in the resin composition was 20 ppm.

Comparative Example 1

An active energy ray curable resin composition was prepared by mixing 40 parts of the urethane acrylate compound (UA2), 22 parts of a urethane diacrylate compound (UA3) (product name: NK Oligo U-2PPA available from Shin-nakamura Chemical Co. Ltd.), 38 parts of dimethacrylate represented by the formula (9) and 1.2 parts of 1-hydroxycyclohexyl phenyl ketone.

Comparative Example 2

An active energy ray curable resin composition was prepared by mixing 20 parts of the urethane acrylate compound (UA2), 45 parts of the urethane diacrylate compound (UA3), 35 parts of dimethacrylate represented by the formula (9) and 2.0 parts of 1-hydroxycyclohexyl phenyl ketone.

Comparative Example 3

An active energy ray curable resin composition was prepared by mixing 15 parts of the urethane acrylate compound (UA2), 60 parts of dimethacrylate represented by the formula (10), 2.0 parts of 1-hydroxycyclohexyl phenyl ketone and 25 parts of phenoxyethyl acrylate.

A compounding list of Examples and Comparative Examples is shown in Table 1.

<Preparation of Cured Resin Material (Flat Board)>

Two Pyrex® glass molds having a diameter of 70 mm whose inside surfaces were previously mirror finished were positioned in parallel at a distance of 1 mm and the molds were surrounded with polyester tape to prepare a die. The active energy ray curable resin compositions of Examples 1 to 7 and Comparative Examples 1 to 3 were each poured into the die. Each resin composition was irradiated with ultraviolet light of 800 mJ/cm$^2$ by a high pressure mercury lamp of 6 kW (120 W/cm) first from one side of the die and then from the other side. The resin composition was cured by the two side irradiation.

<Preparation of Prism Sheet>

Figure 2:
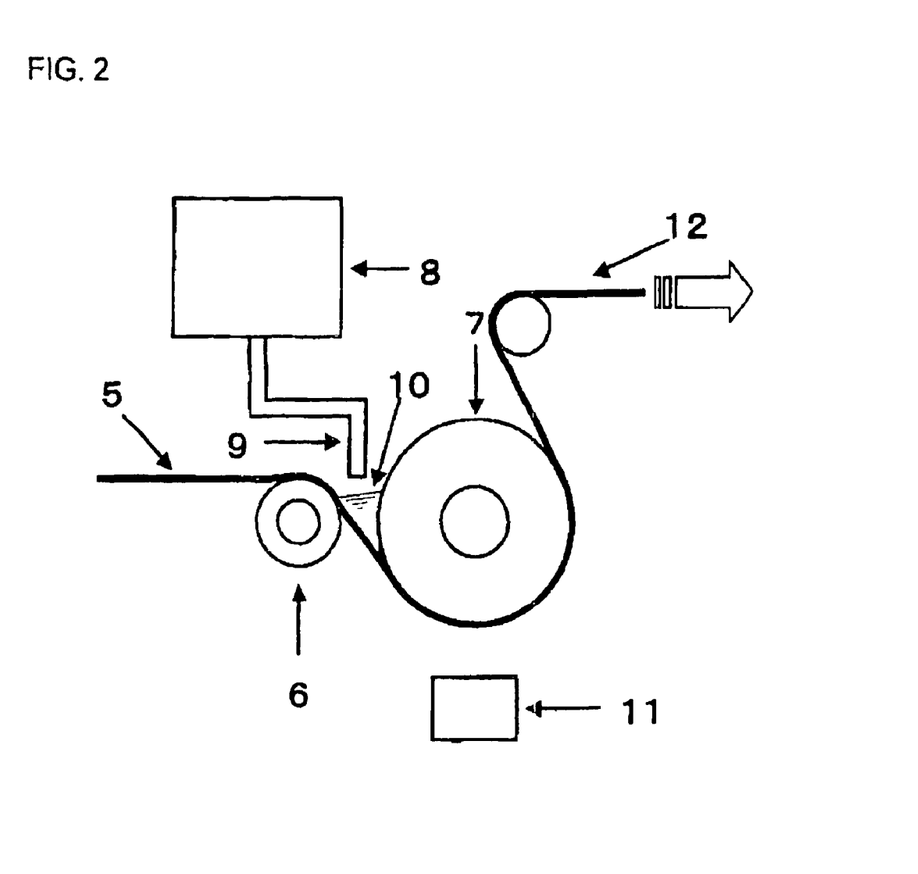
FIG. 2 is a schematic view illustrating a method of preparing a sheet-like optical article (prism sheet) practiced in Examples.

Using the active energy ray curable resin compositions of Examples 1 to 7 and Comparative Examples 1 to 3, a prism sheet was produced by the production equipment shown in FIG. 2. In the following, preparation of a prism sheet is described referring to FIG. 2.

A sheet-shaped transparent substrate 5 was inserted between a cylindrical prism pattern 7 covered with a copper thin film on which many prism rows having an apex angle of 48° are formed at a pitch of 50 μm and a rubber nip roll 6. A PET (polyethylene terephthalate) film (product name: A-4100 available from TOYOBO Co., Ltd., thickness: 188 μm) which has been subjected to surface treatment for improving adhesiveness (surface treated portion 3 in FIG. 1) was used as the sheet-shaped transparent substrate 5.

While inserting the sheet-shaped transparent substrate 5, the sheet-shaped transparent substrate 5 was transferred at a rate of about 5 m/min with feeding the active energy ray curable resin composition 10 between the cylindrical prism pattern 7 and the sheet-shaped transparent substrate 5 from a tank 8 through a pipe 9 having a nozzle on the tip. At this stage, the cylindrical prism pattern 7 rotates along with the movement. The active energy ray curable resin composition 10 sandwiched between the cylindrical prism pattern 7 and the sheet-shaped transparent substrate 5 were cured by ultraviolet irradiation at an irradiation amount of about 850 mJ/cm (measurement device: UV-350 made by ORC MANUFACTURING CO., LTD.) when the composition reached ultraviolet irradiation equipment 11 having, as a light source, a high pressure mercury lamp of 160 W/cm with a lamp light emitting length of 50 cm. After passing through the lamp, the composition was released from the cylindrical prism pattern 7 to give a prism sheet 12 which is a sheet-like optical article.

The thickness of the prism sheet was set to 255 μm. All samples were prepared under the same conditions. A heat source device such as a sheathed heater or a hot water jacket is disposed inside or outside the tank 8 storing the active energy ray curable resin composition and the cylindrical prism pattern 7 so as to keep the temperature constant. A prism sheet was prepared while maintaining the resin temperature in the tank 8 at 35° C. and the surface temperature of the cylindrical prism pattern 7 at 50 to 60° C.

<Method of Evaluation of Physical Properties and Characteristics>

Physical properties and characteristics of the resulting active energy ray curable resin compositions, cured resin materials (flat boards) and prism sheets were evaluated according to the following methods.

(1) Viscosity:

The viscosity at 25° C. of the prepared active energy ray curable resin composition was measured using an E-type viscometer (Viscometer Model RE80 made by TOKI SANGYO CO., LTD.).

(2) Concentration of Strong Acid Contained in Resin Composition:

In Examples and Comparative Examples, the concentration of p-toluenesulfonic acid was measured as the concentration of strong acid.

The concentration of p-toluenesulfonic acid contained in the resin composition was measured using HPLC/Photodiodearray Detector (made by Waters Corporation). Measurement was performed using ZORBAX Eclipse XDB-C18 as a column and a phosphate buffer and acetonitrile as mobile phases at a flow rate of 0.2 ml/min, a temperature of 40° C. and a detection wavelength of 222 nm.

(3) Dynamic Elastic Modulus (25° C., 60° C.):

A flat board having a thickness of 1 mm cut into a length of 30 mm and a width of 10 mm was used as a test piece. The dynamic elastic modulus G' was measured by a rheometer (product name: Rheosol-G3000 made by UBM Co., Ltd.) in a torsion mode under conditions of a frequency of 1.59 Hz, a torsion angle of 0.2 deg and a temperature increase rate of 4° C./min.

(4) Warpage:

<Initial Stage>

The prism sheet prepared was cut into a size of 49 mm in length and 37 mm in width (the direction of the ridgeline of a prism) to prepare a test piece. For measurement of the degree of warpage, the test piece was put on a flat stage with the prism face upward at room temperature and vertical distances from the stage surface at four corners were observed from the side using a microscope to evaluate the warpage based on the average value. Test pieces with an average warpage value of 0.5 mm or less were rated as good and test pieces with an average warpage value of more than 0.5 mm was rated as poor.

<After Storing at High Temperature>

The prism sheet prepared was cut into a size of 188 mm in length and 195 mm in width (the direction of the ridgeline of a prism) to prepare a test piece. The test piece was left in an environment of 60° C. for 6.5 hours with the prism face upward. After removing from the environment of 60° C., the test piece was further left at room temperature for 1 day and warpage was measured in the same manner as measuring warpage at initial stages. Test pieces with an average warpage value of 5.0 mm or less were rated as good and test pieces with an average warpage value of more than 5.0 mm were rated as poor.

(5) Heat Resistance:

The resulting prism sheet was cut into a size of 49 mm in length and 37 mm in width (the direction of the ridgeline of a prism). The piece of the prism sheet was put on an acrylic board (thickness: 3 mm) with the lens face downward and a glass plate was put on the prism sheet so that the load was 0.8 g/cm$^2$. In that state, the prism sheet was left in an environment of 60° C. for 1 hour and removed therefrom. The prism face was then visually observed. Prism sheets without a defect on the prism face was rated as good and prism sheets having a defect due to deformation of a prism was rated as poor.

(6) Retention of Adhesiveness:

The prism sheet was put on a flat stage with the prism face upward and the adhesiveness of the prism sheet was measured at room temperature in accordance with JIS-K5400 "Cross Cut Tape Test".

The prism sheet was treated under a high humidity condition by leaving a test piece of the prism sheet in an environment of a temperature of 60° C. and a humidity of 95% for 1000 hours.

For evaluating the retention of adhesiveness, the adhesiveness of the prism sheet was measured before and after the treatment under a condition of a temperature of 60° C. and a humidity of 95%. Prism sheets in which the adhesiveness after the treatment to that before the treatment was 0 to 40% was rated as "poor", those in which the ratio was 41 to 60% was rated as "moderate", those in which the ratio was 61 to 80% was rated as "good" and those in which the ratio was 81 to 100% was rated as "excellent".

(7) Indentation Elastic Modulus:

<Preparation of Sample for Evaluation>

Figure 3:
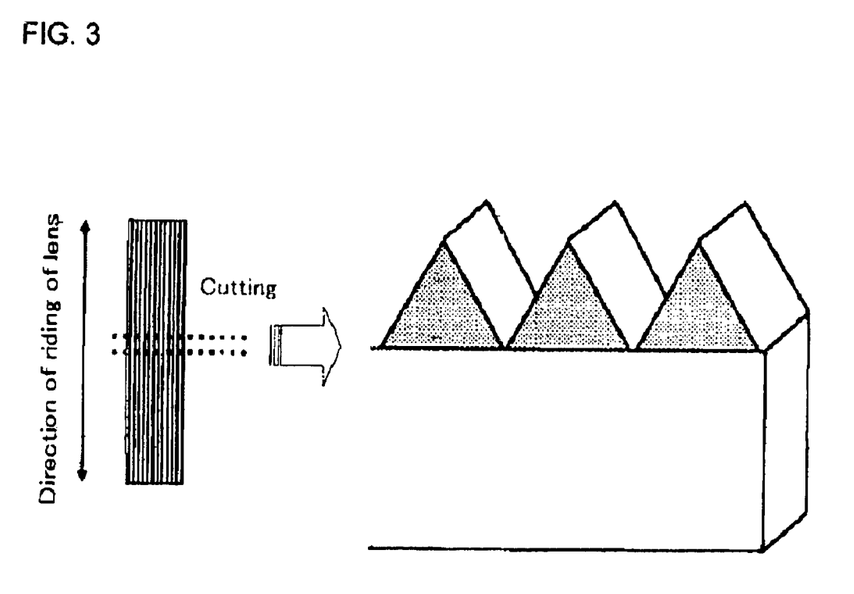
FIG. 3 is a schematic view illustrating the shape of a sample for measuring indentation elastic modulus of a sheet-like optical article (prism sheet) practiced in Examples.

A prism sheet was prepared using a cylindrical prism pattern 7 for forming prism rows with an apex angle of 68° and a pitch of 54 μm under the same conditions as in <Preparation of prism sheet> described above. The resulting prism sheet was cut in the direction perpendicular to prism rows using two parallel razor blades with an interval of 1 mm so that the sheet was shaped as shown in FIG. 3. Further, an adhesive (product name: Araldite available from SHOWA HIGHPOLYMER CO., LTD.) was applied to one side of the sheet cut with the razor blades and the sheet was fixed on a slide glass to give a sample for evaluation.

<Measurement Method>

For measurement of the indentation elastic modulus, Micro Hardness Testing System (equipment name: FISCHER-SCOPE H100V made by Fischer Instruments K.K.) was used. A Vickers quadrangular pyramid (material: diamond) was used as an indenter. The position of the sample was adjusted so that the working point of the indenter is about the center of the peak of a prism 1. For temperature control, a heating stage which is an option of the Micro Hardness Testing System was used.

<Measurement Procedure at Sample Temperature of 25° C.>

The indentation elastic modulus was measured through the following procedure in a temperature-controlled room at 25° C.

(1-1) A load was applied at a loading rate of 1 mN/sec until the load reaches 10 mN.

(1-2) The sample was kept for 60 seconds with the maximum load being applied.

(1-3) The load was reduced at an unloading rate of 2.4 mN/sec until the load reached 0.4 mN.

The above procedure (1-1) to (1-3) was repeated at different measurement positions to collect data at four positions per sample.

<Measurement Procedure at Sample Temperature of 60° C.>

(2-1) The heating stage was adjusted so that the surface temperature of the sample was 60° C.

(2-2) A load was applied at a loading rate of 1 mN/sec until the load reaches 10 mN.

(2-3) The sample was kept for 10 seconds with the maximum load being applied (the time is shortened in order to avoid influence of displacement drift caused by heating of a sample).

(2-4) The load was reduced at an unloading rate of 2.4 mN/sec until the load reached 0.4 mN.

The above procedure (2-2) to (2-4) was repeated at different measurement positions to collect data at four positions per sample.

<Calculation of Indentation Elastic Modulus>

The indentation elastic modulus can be calculated from the relationship between the testing force and the indentation depth of the indenter. Using an analysis software attached to the Micro Hardness Testing System (setting: linear extrapolation mode, an interval with 65% to 95% of the maximum load was specified), the slope of a line obtained from a least square fit of an unloading-indentation depth curve and the intersection point of the line with the slope and the indentation depth axis when the line crosses the point of the maximum load were determined and calculation was performed in accordance with ISO 14577-1 (A.5). In calculation, an elastic modulus of 1200 GPa and a Poisson's ratio of 0.07 of the indenter were employed.

The results of the above evaluation in Examples and Comparative Examples are shown in Table 2.

TABLE 1

| | Component (A) | | Component (B) | | Component (C) | | Component (D) | |
|---|---|---|---|---|---|---|---|---|
| | Compound | Amount to be mixed | Compound | Amount to be mixed | Compound | Amount to be mixed | Compound | Amount to be mixed |
| Ex. 1 | UA1 | 35 | PBOM | 25 | HCPK | 1.2 | — | — |
| | | | BPEM-10 | 40 | | | | |
| Ex. 2 | UA1 | 35 | PBOM | 20 | HCPK | 1.2 | PHE | 5 |
| | | | BPEM-10 | 40 | | | | |
| Ex. 3 | UA1 | 35 | PBOM | 25 | HCPK | 1.2 | PHE | 10 |
| | | | BPEM-10 | 30 | | | | |
| Ex. 4 | UA1 | 40 | GX-8684 | 60 | HCPK | 1.2 | — | — |
| Ex. 5 | UA1 | 35 | PBOM | 25 | HCPK | 1.2 | — | — |
| | | | BPEM-10 | 40 | | | | |
| Ex. 6 | UA1 | 35 | PBOM | 25 | HCPK | 1.2 | — | — |
| | | | BPEM-10 | 40 | | | | |
| Ex. 7 | UA1 | 35 | PBOM | 20 | HCPK | 1.2 | PHE | 5 |
| | | | BPEM-10 | 40 | | | | |
| Comp. Ex. 1 | UA2 | 40 | PBOM | 38 | HCPK | 1.2 | — | — |
| | UA3 | 22 | | | | | | |
| Comp. Ex. 2 | UA2 | 20 | PBOM | 35 | HCPK | 2.0 | — | — |
| | UA3 | 45 | | | | | | |
| Comp. Ex. 3 | UA2 | 15 | BPEM-10 | 60 | HCPK | 2.0 | PHE | 25 |

Unit: part(s) by mass

Abbreviations of compounds in Table 1 are as follows.
UA1: Urethane acrylate compound prepared in Synthetic Example 1
UA2: Urethane acrylate compound prepared in Synthetic Example 2
UA3: urethane diacrylate compound (product name: NK Oligo U-2PPA available from Shin-nakamura Chemical Co. Ltd.)
PBOM: dimethacrylate represented by the formula (9) (product name: ACRYESTER PBOM available from MITSUBISHI RAYON CO., LTD.)
BPEM-10: dimethacrylate represented by the formula (10) (product name: NEW FRONTIER BPEM-10 available from DAI-ICHI KOGYO SEIYAKU CO., LTD.).
GX-8684: dimethacrylate represented by the formula (11) (product name: NEW FRONTIER GX-8684 available from DAI-ICHI KOGYO SEIYAKU CO., LTD.).
PHE: phenoxyethyl acrylate (product name: NEW FRONTIER PHE available from DAI-ICHI KOGYO SEIYAKU CO., LTD.)
HPCK: 1-hydroxycyclohexyl phenyl ketone (product name: IRGACURE 184 available from Ciba Specialty Chemicals)

TABLE 2

| | Viscosity (25° C.) (mPa·s) | Strong acid contained | | Dynamic elastic modulus (MPa) | | Indentation elastic modulus (MPa) | | Warpage (mm) | | Heat resistance | Retention of adhesiveness |
|---|---|---|---|---|---|---|---|---|---|---|---|
| | | Compound | Concentration [ppm] | 25° C. | 60° C. | 25° C. | 60° C. | Initial stage | After storing at high temperature | | |
| Ex. 1 | 781 | PTS | 170 | 540 | 220 | 470 | 395 | 0.30 | 1.61 | Good | Moderate |
| Ex. 2 | 719 | PTS | 170 | 630 | 190 | 610 | 430 | 0.25 | 1.72 | Good | Moderate |
| Ex. 3 | 413 | PTS | 130 | 600 | 220 | 640 | 320 | 0.08 | 1.12 | Good | Moderate |
| Ex. 4 | 1823 | PTS | 250 | 650 | 330 | 790 | 110 | 0.40 | 2.15 | Good | Moderate |
| Ex. 5 | 775 | PTS | 70 | 540 | 220 | 465 | 400 | 0.30 | 1.60 | Good | Good |
| Ex. 6 | 775 | PTS | 20 | 540 | 220 | 465 | 400 | 0.30 | 1.60 | Good | Excellent |
| Ex. 7 | 715 | PTS | 20 | 630 | 190 | 605 | 430 | 0.25 | 1.71 | Good | Excellent |
| Comp. Ex. 1 | 1800 | PTS | 30 | 980 | 650 | 1140 | 930 | 0.85 | 10.8 | Good | Moderate |
| Comp. Ex. 2 | 1951 | PTS | 30 | 1050 | 660 | 1550 | 1200 | 1.00 | 11.6 | Good | Moderate |
| Comp. Ex. 3 | 241 | PTS | 250 | 325 | 32 | 135 | 80 | 0.01 | 0.35 | Poor | Moderate |

The abbreviation of compounds in Table 2 is as follows:
PTS: p-toluenesulfonic acid <Results of Evaluation of Physical Properties and Characteristics>

As shown in Table 2, in Examples 1 to 7 satisfying a dynamic elastic modulus at 25° C. of 950 MPa or less and a dynamic elastic modulus at 60° C. of 100 MPa or more, the prism sheet has reduced warpage and good heat resistance. On the other hand, in Comparative Examples 1 and 2 in which the dynamic elastic modulus at 25° C. is more than 950 MPa, the prism sheet has warped. Also, although the prism sheet has reduced warpage in Comparative Example 3 in which the dynamic elastic modulus at 60° C. is less than 100 MPa, the prism sheet has poor heat resistance.

Likewise, in Examples 1 to 7 satisfying an indentation elastic modulus at 25° C. of 1000 MPa or less and an indentation elastic modulus at 60° C. of 90 MPa or more, the prism sheet has reduced warpage and good heat resistance. On the other hand, in Comparative Examples 1 and 2 in which the indentation elastic modulus at 25° C. is more than 1000 MPa, the prism sheet has warped. Also, although the prism sheet has reduced warpage in Comparative Example 3 in which the indentation elastic modulus at 60° C. is less than 90 MPa, the prism sheet has poor heat resistance.

Further, comparison of warpage between Example 1 and Example 3 shows that although the dynamic elastic modulus at 25° C. is higher in Example 3, the warpage is apparently smaller in Example 3. This is attributable to the effect of reducing warpage of component (D) which is contained in Example 3 but not in Example 1.

Further, when the prism sheets prepared in Examples 1 to 7 were each put on a backlight and the brightness distribution was observed by a goniometer, high peak brightness as designed was observed without an optical defect due to a defective prism shape, which means that the resulting prism sheets have excellent optical properties.

Also, comparison of retention of adhesiveness between Example 1, Example 5 and Example 6 shows that the retention of adhesiveness is higher in Example 5 than in Example 1, and even higher in Example 6. This is because the concentration of p-toluenesulfonic acid contained in the resin composition is reduced in Examples 5 and 6 compared to Example 1. Likewise, comparison between Example 2 and Example 7 shows that the retention of adhesiveness is higher in Example 7 than in Example 2.

The invention claimed is:

1. An active energy ray curable resin composition for a sheet-shaped optical article comprising
   (A) a urethane acrylate compound obtained by reacting hexamethylene diisocyanate, an isocyanurate triisocyanate compound prepared by trimerizing hexamethylene diisocyanate, 2-hydroxypropyl acrylate and pentaerythritol triacrylate,
   (B) a di(meth)acrylate compound containing no urethane bond and containing two (meth)acryloyl groups in the molecule and
   (C) a radical photopolymerization initiator, and
which is capable of providing a cured material having a dynamic elastic modulus at 25° C. of 950 MPa or less and a dynamic elastic modulus at 60° C. of 100 MPa or more, and in which strong acid is contained at a concentration of less than 100 ppm.

2. A sheet-shaped optical article prepared using an active energy ray curable resin composition, wherein the active energy ray curable resin composition comprises
   (A) a urethane acrylate compound obtained by reacting hexamethylene diisocyanate, an isocyanurate triisocyanate compound prepared by trimerizing hexamethylene diisocyanate, 2-hydroxypropyl acrylate and pentaerythritol triacrylate,
   (B) a di(meth)acrylate compound containing no urethane bond and containing two (meth)acryloyl groups in the molecule and
   (C) a radical photopolymerization initiator, and
which is capable of providing a cured material having a dynamic elastic modulus at 25° C. of 950 MPa or less and a dynamic elastic modulus at 60° C. of 100 MPa or more.

3. The active energy ray curable resin composition for a sheet-shaped optical article according to claim 1, further comprising (D) a compound having a polymerizable double bond group in the molecule in addition to components (A) to (C).

* * * * *